US008777719B2

(12) United States Patent
Mayeroff

(10) Patent No.: US 8,777,719 B2
(45) Date of Patent: Jul. 15, 2014

(54) GAMING DEVICE AND METHOD OF CONDUCTING A GAME WITH A CHANGEABLE BONUS VALUE FEATURE

(75) Inventor: Jason M. Mayeroff, Bangkok (TH)

(73) Assignee: Battle Born Gaming, Inc., Seychelles (SC)

( * ) Notice: Subject to any disclaimer, the term of this patent is extended or adjusted under 35 U.S.C. 154(b) by 0 days.

(21) Appl. No.: 10/815,304

(22) Filed: Mar. 31, 2004

(65) Prior Publication Data

US 2004/0214630 A1 Oct. 28, 2004

Related U.S. Application Data

(60) Provisional application No. 60/464,937, filed on Apr. 22, 2003.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3211* (2013.01); *G07F 17/3244* (2013.01)

USPC .................. 463/20; 463/26; 463/32; 463/34; 463/46

(58) Field of Classification Search

USPC .................................. 463/20, 26, 32, 34, 46

See application file for complete search history.

(56) References Cited

U.S. PATENT DOCUMENTS

| | | | | |
|---|---|---|---|---|
| 5,513,846 | A * | 5/1996 | Niederlein et al. | 273/143 R |
| 5,697,843 | A * | 12/1997 | Manship et al. | 463/20 |
| 6,059,658 | A * | 5/2000 | Mangano et al. | 463/16 |
| 6,089,978 | A * | 7/2000 | Adams | 463/20 |
| 6,146,273 | A * | 11/2000 | Olsen | 463/27 |
| 6,155,925 | A * | 12/2000 | Giobbi et al. | 463/20 |
| 6,203,429 | B1 * | 3/2001 | Demar et al. | 463/20 |
| 6,315,666 | B1 * | 11/2001 | Mastera et al. | 463/31 |
| 7,470,181 | B2 * | 12/2008 | Gauselmann | 463/16 |
| 7,736,228 | B2 * | 6/2010 | Seelig et al. | 463/31 |
| 2002/0065126 | A1 * | 5/2002 | Miller et al. | 463/20 |
| 2003/0060281 | A1 * | 3/2003 | Vancura | 463/30 |
| 2004/0018871 | A1 * | 1/2004 | Seelig et al. | 463/20 |
| 2004/0092315 | A1 * | 5/2004 | Boyd et al. | 463/42 |

* cited by examiner

*Primary Examiner* — Adetokunbo O Torimiro

(74) *Attorney, Agent, or Firm* — Robert Ryan Morishita; Morishita Law Firm, LLC

(57) ABSTRACT

A bonus device and method are set forth for gaming machines. The bonus device is configured as a two dimensional display or three dimensional object, such as a sphere, box, or football shape, which can be controlled to rotate, spin or move to display a bonus. The bonus device is embedded with display technology that allows the bonus amounts, to change upon certain conditions in the base game such as an increased number of credits wagered, combinations achieved in the base game, or other random occurrences.

38 Claims, 6 Drawing Sheets

GAMING DEVICE AND METHOD OF CONDUCTING A GAME WITH A CHANGEABLE BONUS VALUE FEATURE

CROSS-REFERENCE TO RELATED APPLICATION

The present application claims the benefit of commonly owned and prior filed provisional patent application Ser. No. 60/464,937 filed Apr. 22, 2003 and titled “Gaming Device and Method of Displaying a Three-Dimensional Bonus Feature”.

FIELD OF THE INVENTION

This invention relates to gaming machines which include a bonus game and display and more particularly it relates to bonus displays and still more particularly moveable bonus displays.

BACKGROUND

Casino gaming machines are well known in the art. Such devices may be embodied as spinning reel slot machines, video slot machines, Video Poker machines or the like. These machines are played by a player making a wager and prompting play. A computer processor for the device selects and displays an outcome. For a slot machine, the processor randomly selects and displays symbols which combination or combinations define one or more winning outcomes. The player receives an award for each winning outcome and loses their wager for losing outcomes.

It has become popular to provide, for gaming devices such as slot machines, one or more bonus game features. As is known in the art, the player makes their wager and plays a base game obtaining winning and losing outcomes. When a trigger condition is obtained, the bonus feature is enabled. The bonus feature may entail the display of bonus outcome selections where the player makes a selection to reveal a bonus. In one popular game, a bonus feature is embodied as an electromechanical spinning “Wheel of Fortune” which spins to reveal a bonus amount.

One drawback of these bonus games is that the bonus feature display, when not in play or when the device is idle, does not function to actively attract players. The bonus displays of some games have an idle mode where they display simulated bonus awards or pictures consistent with the theme of the game. There is a need for a bonus display which has features adapted to attract players to the game when the game is idle.

The major drawback of such games, however, is that the awards in the bonus feature display remain a constant, static amount. There is a need for physical, moveable, bonus display device in which the awards in the bonus change, often increasing, upon certain conditions in the overall game, such as the player staking an increased number of coins or credits.

DESCRIPTION

Figure 1:
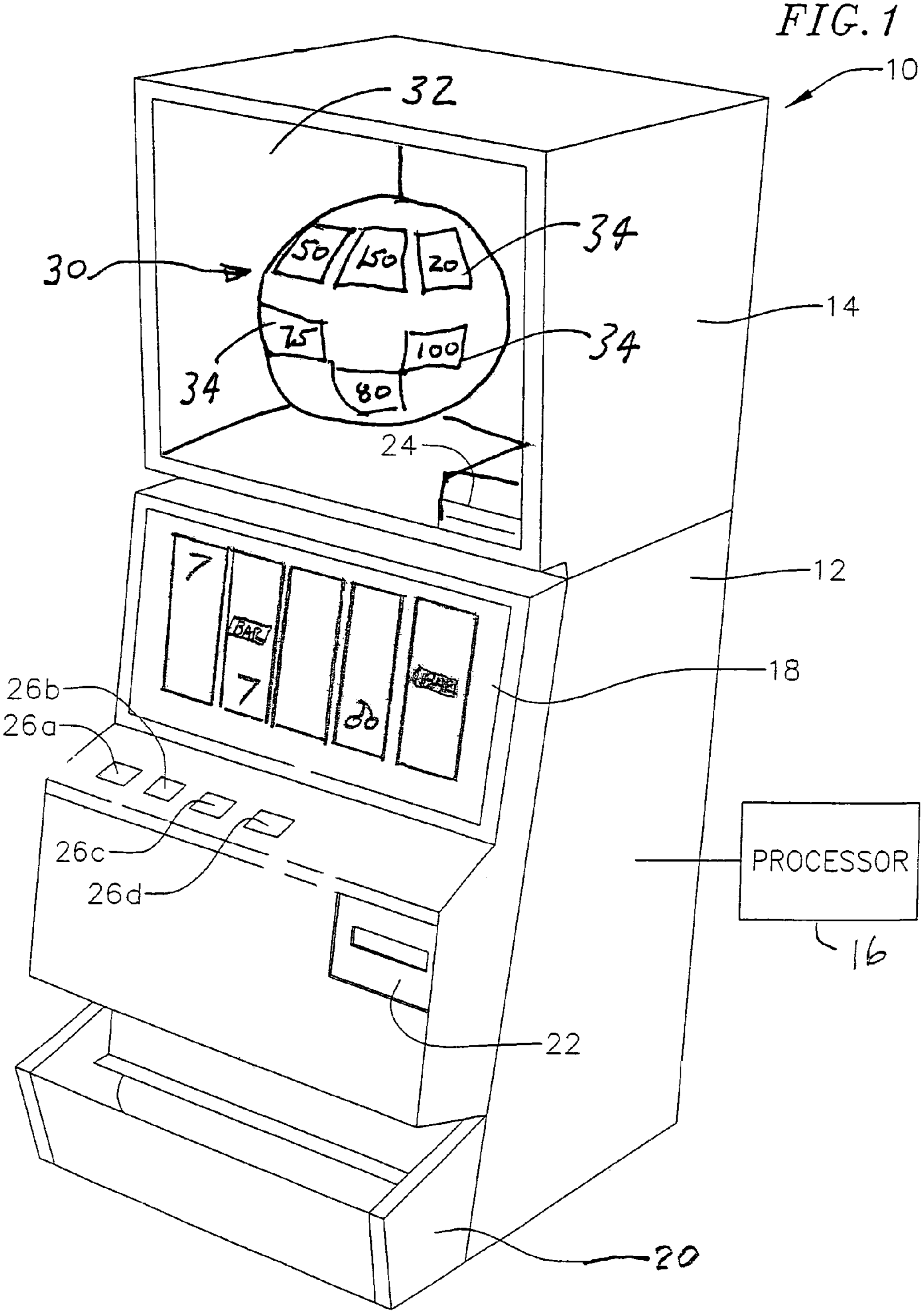
FIG. 1 shows an example of a device for playing one illustrative embodiment of the game using a wheel bonus selection display device.

Turning to FIG. 1 there is shown an embodiment of a gaming device 10 according to the present invention. The device 10 includes a housing 12 supporting a bonus device compartment 14. The housing 12 contains a game controlling computer processor 16, which controls the various aspects of the gaming device 10. As shown the housing 12 also mounts a base game display 18, which may be embodied as a video display such as a VRT, plasma or other electronic display or may be embodied as a view glass to view three or more electro-mechanical reels as is known in the art. For purposes of illustration, the base game display 18 is depicted as a video display of a five-reel slot machine game. It should be understood, however, that the base game may take any slot machine or gaming machine form such as by being a 3-Reel spinning reel slot machine, Video Poker game, Video Keno, Video Lottery, Video Blackjack or the like.

To control the processor 16 and the play of the base game, the housing mounts a plurality of control buttons positioned below the base game display 18. At 26*a* there is provided a cash out button which, if depressed by the player, controls the processor 16 to pay to the player in the form of tokens, voucher or the like, accumulated game credits in a manner well known in the art. Bet one button 26*b* enables the player to wager one unit at a time. Button 26*c* is a max-bet button that enables the player to wager the maximum amount for the play of the base game. Spin button 26*d* prompts the play of the base game.

The aforementioned buttons or prompts may be also embodied as touch areas on a touch screen based game display 18.

To enable a player to accumulate game credits, the device 10 may also include a cash validator 22 of the type well known in the art. Other means such as a token acceptor (not shown) or debit or credit card reader 24 may be provided.

A token accepting tray 20 may also be provided to accept token dispensed by the device 10 when the player touches the cash out button 26*a*.

To play the base game, the player accumulates game credits in the device 10 as by inserting a cash note, script or voucher into the cash validator 22. The player then decides how much to wager. It will be assumed that the player decides to wage the maximum amount and therefore touches the max bet button 26*c*. The appropriate number of credits are deducted from the inventory of game credits and the processor 16 is prompted to randomly select and display at the base game display, a base game outcome represented by a matrix of game symbols. As is known with slot machine games, the matrix of symbols defines numerous pay lines, e.g. horizontal rows, diagonals, reflecting, through the matrix. The processor 16 tests each pay line that has been wagered upon and if a pay line has one of a predetermined schedule of winning outcomes or if the matrix has scattered symbols combinations, the player is issued an award. If a pay line does not embrace a winning symbol combination, the player loses their wager amount for that pay line. Thus the player may obtain numerous and frequent base game winning outcomes. For winning outcomes, the player receives an award typically in the form of game credits summed into the game credit inventory.

According to the present invention, one or more base game pay line or scattered symbol outcomes defines a bonus game trigger. Should the player obtain such an outcome (with the requisite amount wagered or the triggering pay line enabled by a wager) the processor 16 detects this condition and controls the gaming device 10 to enable the bonus phase. Alternatively, the base game may contain no apparent trigger combination that enables the bonus event. The wheel or other bonus apparatus may be set by the processor to be award at random, without the use of a trigger combination in the base game, in a "mystery prize" format.

Figure 2:
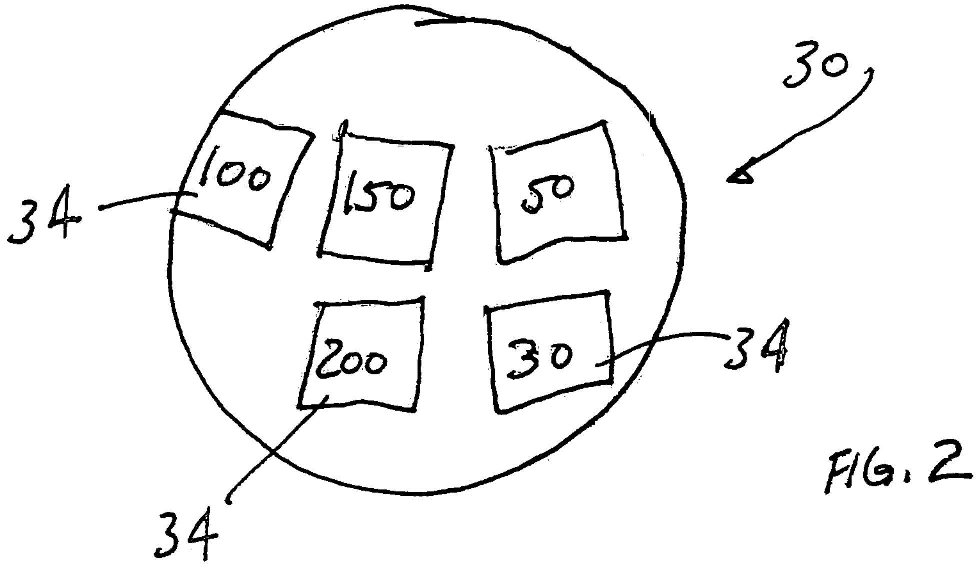
FIG. 2 shows an example of a spherical type bonus display device.

To provide for the play and presentation of the bonus phase of the gaming device 10, the compartment 14 includes a display that may be embodied as a physical, three-dimensional object, a two-dimensional physical display such as a wheel, or as a video display depicting a three-dimensional object. With reference to FIGS. 1 and 2 there is shown a rotatable wheel 30 contained within the compartment 14. Preferably the wheel 30 is mounted for rotation within the compartment 14 that is optionally covered with glass 32. To provide the three-dimensional effect using a video display, the display may be done using 3-D technology where the player is provided with viewing glasses (e.g. disposable 3-D glasses) or the display may be embodied as overlaying displays to produce the three-dimensional effect.

The wheel 30, includes a plurality of surface panels 34, each of which having a display of a bonus amount, at each section of the wheel. For example, and as suggested in FIG. 2, each panel 34 may have imprinted thereon a bonus amount. These display within the wheel use LED, LCD, liquid quartz, video or other display technology to provide for changing the awards amount at any panel during the course of the gam e. The number of bonus credits to be won by the player may change upon certain conditions in the overall game, such as the player wagering an increased number of coins or credits.

While the gaming device 10 is idle, the wheel 30 may be controlled to rotate to provide a visual display to attract players. Lights may be disposed on the wheel 30 and lit in conjunction with rotation to increase the visual attraction of the device 10.

When a bonus trigger condition is obtained, the processor 16 controls the bonus feature to select and display the bonus award for the player. With reference to FIGS. 1 and 2, the processor 16 randomly selects a bonus amount from a schedule of bonus amounts (the amounts may be arranged in a non-uniform probability distribution so that certain amounts are more likely to be selected than others) and controls the sphere 30 to display the amount. For example, the processor 16 may control the wheel or 3-D Object (which may represent an soccer ball, baseball, golf ball or other spherical object consistent with the theme of the base game), in a first mode where the wheel 30 rotates and processes through various bonus amounts to increase the excitement and anticipation prior to display of the amount to be awarded. Within the compartment 14 there may be provided lights to increase the visual appearance of the bonus device 30. Sound may also be provided to further contribute to the entertainment value of the bonus feature for the player and bystanders.

Figure 3:
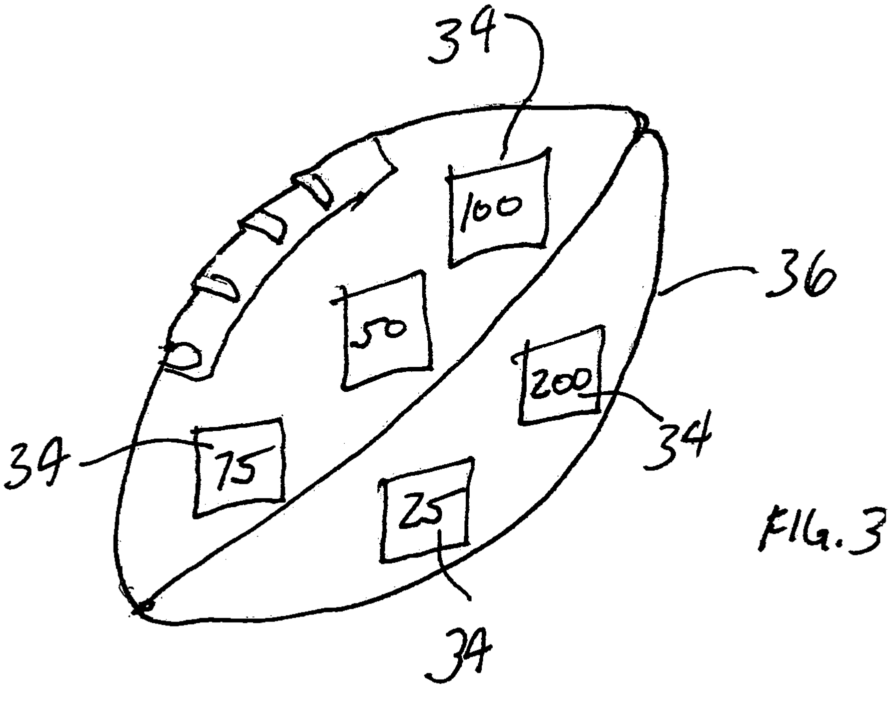
FIG. 3 shows an example of a display device in an ellipsoid shape of a football.

With reference to FIG. 3 there is shown an embodiment where the bonus feature includes a three-dimensional object simulating a football 36 having bonus revealing surface elements 34 thereon. When the bonus phase is triggered the football 36 is shown to spin and/or gyrate to eventually reveal the surface element with the bonus. The movement of the football 36 is preferably accompanied by sounds and lights to enhance the sensory impact of the bonus feature to the player and bystanders.

Figure 4:
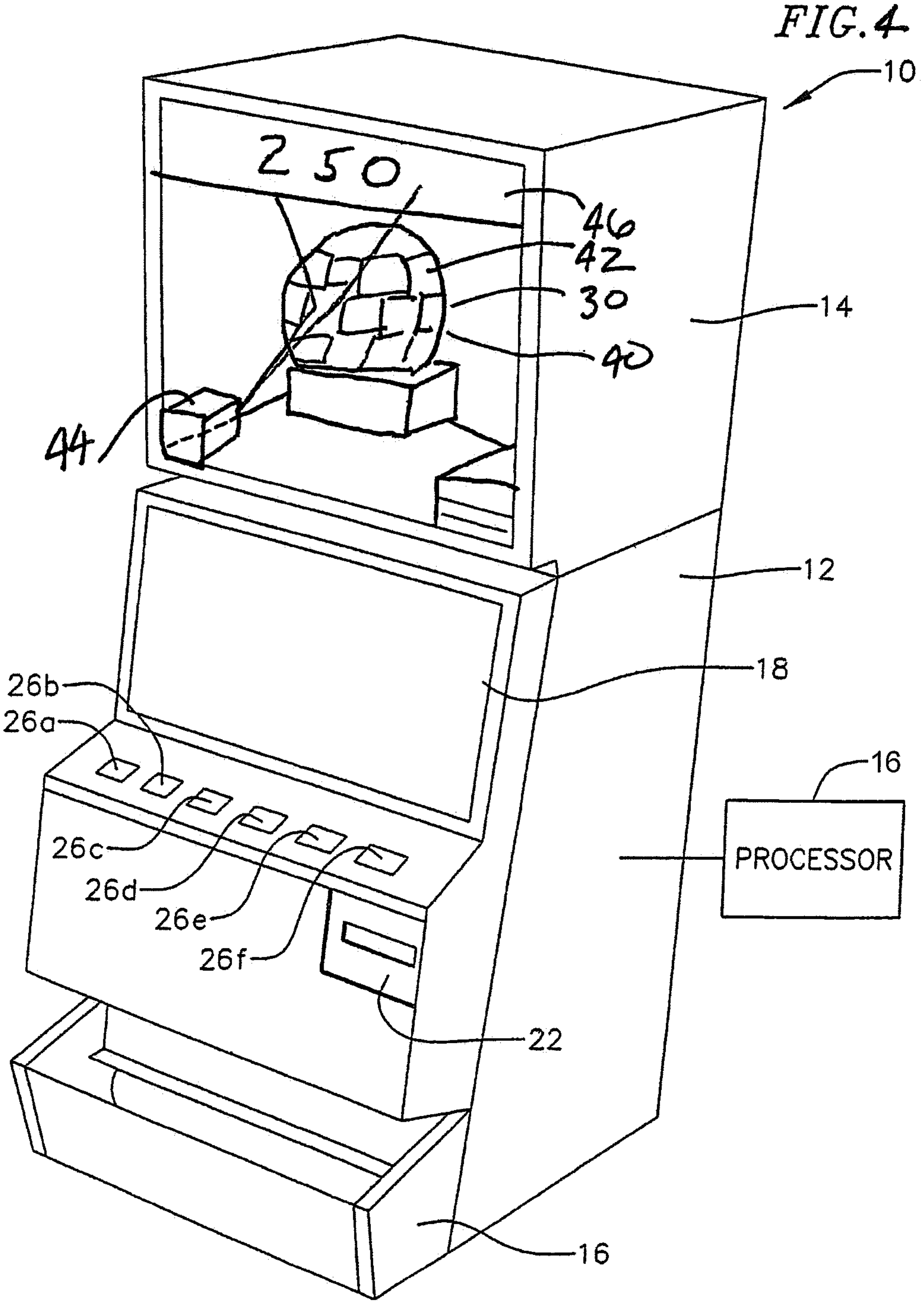
FIG. 4 shows an example of a device using a spherical display device and projection.

Turning to FIG. 4 there is disclosed another embodiment of the invention. According to this embodiment the three-dimensional object such as the sphere 30 is provided with a surface 40 having one or more reflecting elements 42. A projector 44 is disposed in the device 10 to project views onto the sphere 30 for reflection and display to the player. As shown, the glass 32 may have a panel 46 to receive the projection for the display of the same. Accordingly, the wheel 30 may be rotated while the device 10 is idle with the projector 44 projecting light onto the wheel 30 to create an attractive display to bring a play to the game. Upon placing a wager the processor 16 discontinues the idle mode for the display and device 10 base game is played by the player. Upon obtaining a triggering condition, the wheel 30 is rotated and the projector 44 ultimately projects the bonus to be awarded which is reflected by the sphere to the panel 46.

Figure 5:
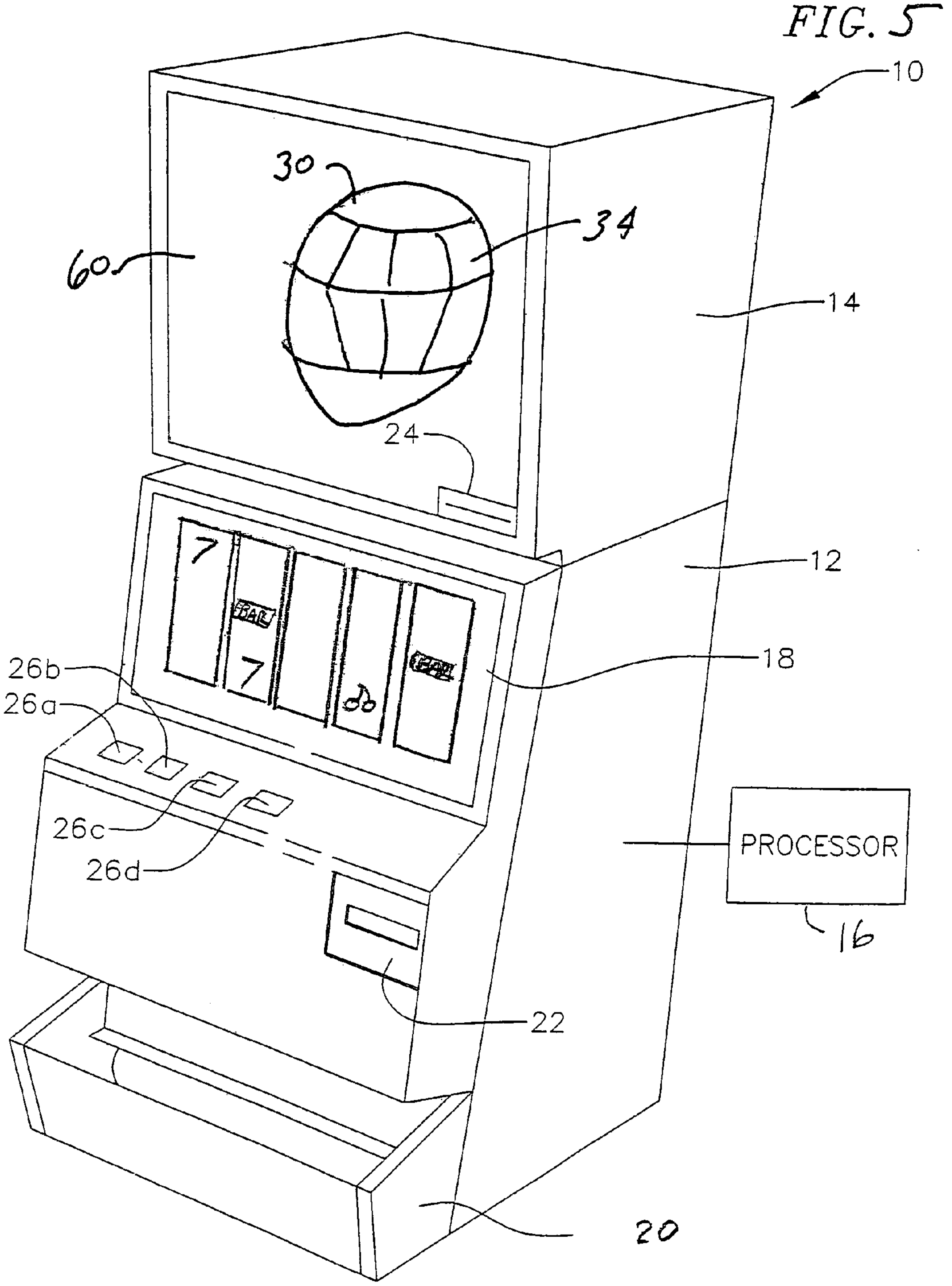
FIG. 5 shows an alternative apparatus where the bonus display is a video display.

Turning to FIG. 5 there is shown a further embodiment of FIG. 1 wherein the display includes a video display 60 such as a VRT or plasma display where the wheel 30 is a virtual sphere displayed at the display. The display 60 is controlled by the processor 16 to have an idle mode display where the display 60 may display the sphere 60 rotating and gyrating to attract a player to the device 10. The processor 16 controls the display 60 to display the sphere 30 in various modes including the display of any bonus awards.

Figure 6:
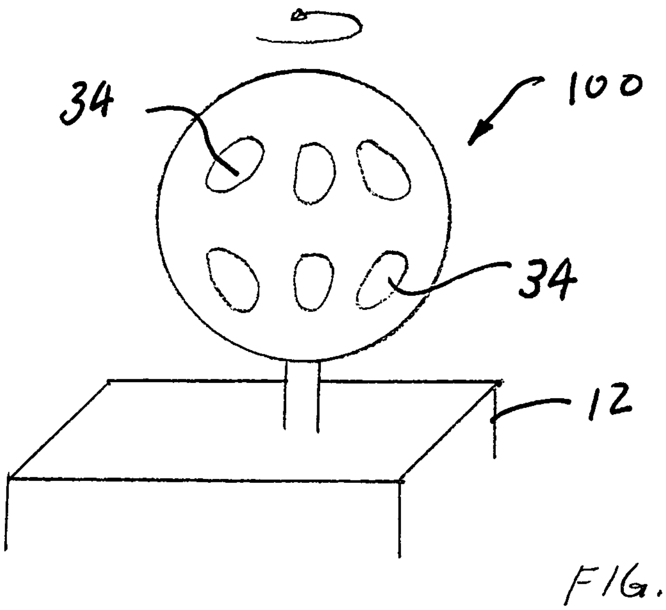
FIG. 6 shows an alternative apparatus where the bonus display is a video display.

FIG. 6 shows another embodiment of the bonus display 100 is embodied as a free standing sphere with panels 34 supported by the housing 12. The free standing sphere 100. By projecting the sphere above the housing 12, the device 10 presents an attractive game for players and for passers by.

Figure 7:
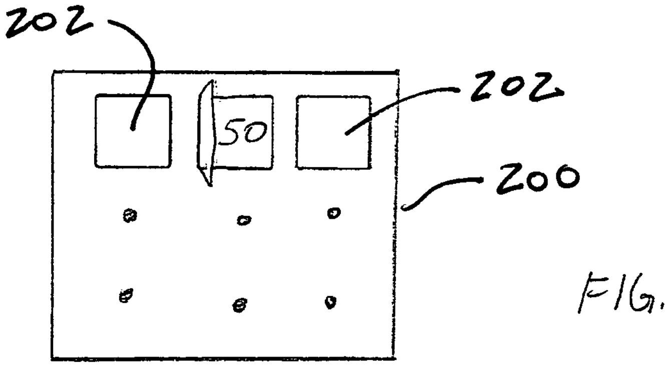
FIG. 7 shows an alternative apparatus where the bonus display is a video display.

In FIG. 7 there is shown a further embodiment of the bonus display embodied as a box 200 including a plurality of mechanical doors 202 which are controlled to open to reveal the bonus.

Figure 8:
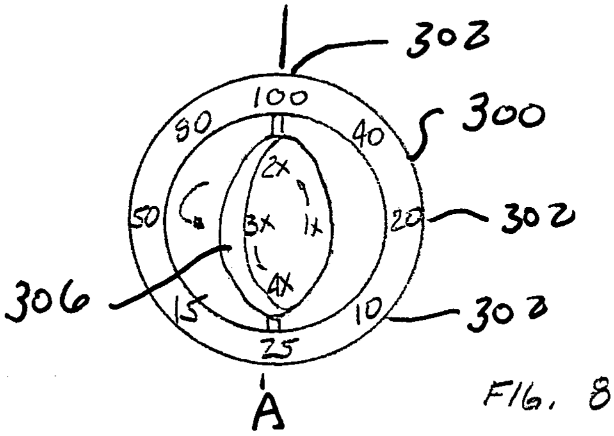
FIG. 8 shows an alternative apparatus where the bonus display is a video display.

FIG. 8 shows yet a further embodiment of the bonus display including an outer ring 300 to display bonus awards. For example, the outer ring 300 may include backlit segments 302 which are selectively backlit to display a bonus amount. Alternatively, the outer ring 300 may be controlled to spin or simulate spinning, to register the bonus award amount at an index position which signifies the award.

Within the outer ring 300 is an inner display 306 which is controlled to spin about an axis A within the outer ring 300. The inner display 306 contains a display of bonus award modifiers such as multipliers or additional award amounts. When the bonus is triggered, the outer ring 30 and inner display 306 are controlled by the processor 16 to (1) display an award amount from the outer ring 300 and (2) a modifier with the inner display 306. For example, the outer ring 300 may be controlled to simulate spinning to register a bonus award amount at an index, e.g. 100 credits. The inner display 306 spins and processes through various multiplier awards to eventually stop in a position coplanar with the outer ring 300 whereby a multiplier amount likewise registers with the index whereby the player wins the award of the outer ring 300 multiplied by the multiplier of the inner display 306.

It must be understood that the three-dimensional objects need not be spherical, oblong or any other shape. They could be cubical as a die with six or more sides, parallelpipedal or any other shape. Further, more than one object may be included in the display.

Figure 9:
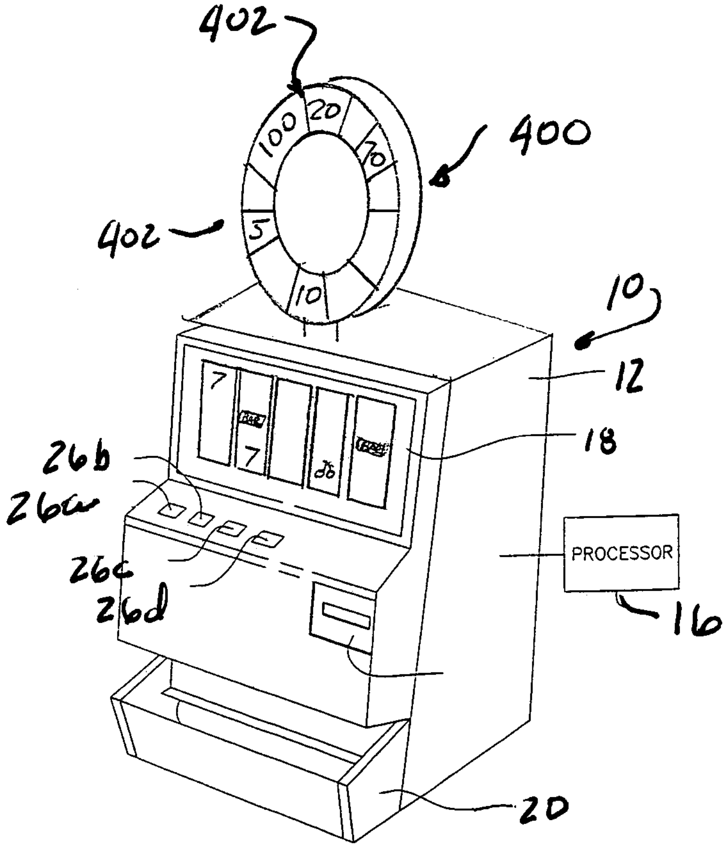
FIG. 9 shows a further alternative apparatus where the bonus display is a video display.

FIG. 9 shows another embodiment of the present invention. According to this embodiment the device 10 has a housing 12 supporting an upstanding video (LCD, VRT CRT, plasma) display 400 which may be circular, square or any other desired shape. The display 400 reveals a plurality of award values 402 as controlled by the processor 16. The processor 16 may control the display 400 to display the values flashing or progressing or moving in the display 400 until the ultimate award is revealed.

While I have shown and described certain embodiments of the present invention, it should be understood that the same is subject to modification without departing from the spirit and scope of the invention.

The invention claimed is:

1. A device, comprising:

a computer processor adapted to conduct a base game; and a bonus selection apparatus in communication with said computer processor, said bonus selection apparatus including a plurality of changeable surface display elements, wherein said computer processor is programmed to:

(a) populate said bonus selection apparatus with a plurality of changeable bonus award amounts by identifying a plurality of bonus award amounts for display on said bonus selection apparatus from a schedule of bonus award amounts and display said plurality of identified bonus award amounts on said plurality of changeable surface display elements in response to the identification of said plurality of changeable bonus award amounts by said computer processor, wherein a plurality of changeable bonus award amounts are displayed on separate changeable surface display elements and wherein the number of bonus award amounts displayed on said bonus selection apparatus is less than the number of bonus award amounts available to be displayed according to said schedule of bonus award amounts; and (b) conduct a bonus feature in response to a bonus trigger condition detected by said computer processor by controlling said bonus selection apparatus to select at least one bonus award amount from among said at least one bonus award amount, including said plurality changeable bonus award amounts, displayed on said bonus selection apparatus.

2. The device of claim 1 wherein said bonus selection apparatus is rotatable about an axis and includes a plurality of said surface display elements disposed on said bonus selection apparatus such that different bonus award amounts are visible as said bonus selection apparatus rotates such that said bonus selection apparatus is adapted to select at least one bonus award amount from among said bonus award amounts, including said plurality of changeable bonus award amounts, by rotating said surface display elements.

3. The device of claim 1 wherein said bonus selection apparatus is fixed and includes a plurality of said surface display elements disposed on said bonus selection apparatus.

4. The device of claim 1 wherein said bonus selection apparatus comprises a video display adapted to depict an object with said bonus award amounts arranged on the surface of said object, said object depicted as a rotating image such that different bonus award amounts are visible as said object moves.

5. The device of claim 1, wherein said computer processor is adapted to randomly identify at least one changeable bonus award amount for display on said bonus selection apparatus.

6. The device of claim 1 wherein said computer processor is programmed to conduct a base game and identify, during the course of conducting said base game, at least one changeable bonus award amount for display on said bonus selection apparatus.

7. The device of claim 6 wherein said bonus selection apparatus is adapted to change the display of at least one of said bonus award amounts during the course of said base game.

8. The device of claim 1 wherein said computer processor is programmed to conduct a series of base games and identify, between conducting said base games, at least one changeable bonus award amount for display on said bonus selection apparatus.

9. The device of claim 8 wherein said bonus selection apparatus is adapted to change the display of said plurality of bonus award amounts between base games.

10. The device of claim 8 wherein said bonus selection apparatus is adapted to change the display of said plurality of bonus award amounts during the course of said base game.

11. A device, comprising:

a computer processor programmed to conduct a base game in response to an input received from a player; and a bonus selection apparatus in communication with said computer processor, said bonus selection apparatus including a plurality of changeable surface display elements, wherein said computer processor is programmed to:

(a) populate said bonus selection apparatus by identifying a plurality of changeable bonus award amounts from a schedule of bonus award amounts and changing said plurality of changeable surface display elements to display said plurality of identified bonus award amounts on said changeable surface display elements in response to the identification of said plurality of changeable bonus award amounts by said computer processor, wherein each of the bonus award amounts is displayed on a separate changeable surface display element and wherein the number of bonus award amounts displayed on said bonus selection apparatus is less than the number of bonus award amounts available to be displayed according to said schedule of bonus award amounts;

(b) conduct a bonus feature in response to a bonus trigger condition detected by said computer processor by controlling said bonus selection apparatus to select at least one bonus award amount from among the bonus award amounts, including said changeable bonus award amounts, displayed on said bonus selection apparatus; and (c) issue said at least one bonus award amount selected by the bonus selection apparatus to said player.

12. The device of claim 11 wherein said base game produces at least one outcome, wherein said computer processor is adapted to identify said plurality of changeable bonus award amounts for display on said bonus selection apparatus based, at least in part, on an outcome of the base game.

13. The device of claim 12 wherein said base game includes game symbols and said outcome of said base game is based on at least one game symbol selected in said base game.

14. The device of claim 12 wherein said base game includes game symbols and said outcome of said base game is based on at least one combination of game symbols selected in said base game.

15. The device of claim 12 wherein said outcomes include at least one winning outcome, wherein said computer processor is adapted to identify said plurality of changeable bonus award amounts for display on said bonus selection apparatus based, at least in part, on the occurrence of at least one winning outcome in said base game.

16. The device of claim 12 wherein said outcomes include at least one winning outcome, wherein said computer processor is adapted to identify said plurality of changeable bonus award amounts for display on said bonus selection apparatus based, at least in part, on the occurrence of no winning outcomes in said base game.

17. The device of claim 11, wherein said computer processor is adapted to randomly identify said plurality of changeable bonus award amounts for display on said bonus selection apparatus.

18. The device of claim 11 wherein said computer processor is adapted to identify said plurality of changeable bonus award amounts for display on said bonus selection apparatus based, at least in part, on the quantity of base games played.

19. The device of claim 18 wherein each base game produces at least one outcome, said outcomes including at least one losing outcome, wherein said computer processor is adapted to identify said plurality of changeable bonus award amounts for display on said bonus selection apparatus based, at least in part, on the quantity of consecutive base games in which a losing outcome is produced.

20. The device of claim 11 wherein said computer processor is programmed to identify, during the course of conducting said base game, said plurality of changeable bonus award amounts for display on said bonus selection apparatus.

21. The device of claim 20 wherein said bonus selection apparatus is adapted to change the display of said bonus award amounts during the course of said base game.

22. The device of claim 11 wherein said computer processor is programmed to conduct a series of base games and identify, between conducting said base games, said plurality of changeable bonus award amounts for display on said bonus selection apparatus.

23. The device of claim 22 wherein said bonus selection apparatus is adapted to change the display of said bonus award amounts between base games.

24. The device of claim 22 wherein said bonus selection apparatus is adapted to change the display of said bonus award amounts during the course of said base game.

25. A method comprising:

providing a bonus selection apparatus at a gaming device having a processor and a base game display, said bonus selection apparatus including at least one changeable surface display element;

said processor conducting a base game at said gaming device;

populating said bonus selection apparatus by:

(a) said processor identifying a plurality of changeable bonus award amounts for display on said bonus selection apparatus from a schedule of bonus award amounts wherein the number of bonus award amounts identified for display on said bonus selection apparatus is less than the number of bonus award amounts available to be displayed according to said schedule of bonus award amounts; and (b) said processor signaling said plurality of changeable surface display elements to change such that a plurality of said identified bonus award amounts are displayed on said bonus selection apparatus on separate surface display elements, wherein said plurality of changeable bonus award amounts identified for display on said bonus selection apparatus replace any bonus award amounts previously displayed on said surface display element;

said processor conducting a bonus feature in response to a bonus trigger condition by controlling said bonus selection apparatus to select a bonus award amount from among said plurality of bonus award amounts, including said changeable bonus award amounts, displayed at said bonus selection apparatus; and said processor awarding the selected bonus award amount, if any.

26. The method of claim 25 wherein said base game produces at least one outcome, wherein said step of identifying a plurality of changeable bonus award amounts for display on said bonus selection apparatus is based, at least in part, on an outcome of the base game.

27. The method of claim 26 wherein said base game includes game symbols and said outcome of said base game is based on at least one game symbol selected in said base game.

28. The method of claim 26 wherein said base game includes game symbols and said outcome of said base game is based on at least one combination of game symbols selected in said base game.

29. The method of claim 26 wherein said outcomes include at least one winning outcome, wherein said step of identifying a plurality of changeable bonus award amounts for display on said bonus selection apparatus is based, at least in part, on the occurrence of at least one winning outcome in said base game.

30. The method of claim 26 wherein said outcomes include at least one winning outcome, wherein said step of identifying a plurality of changeable bonus award amounts for display on said bonus selection apparatus is based, at least in part, on the occurrence of no winning outcomes in said base game.

31. The method of claim 25, wherein said step of identifying a plurality of changeable bonus award amounts for display on said bonus selection apparatus includes is randomly identifying a plurality of changeable bonus award amounts.

32. The method of claim 25 wherein said step of identifying a plurality of changeable bonus award amounts for display on said bonus selection apparatus is based, at least in part, on the quantity of base games played.

33. The method of claim 25 wherein each base game produces at least one outcome, said outcomes including at least one losing outcome, wherein said step of identifying a plurality of changeable bonus award amounts for display on said bonus selection apparatus is based, at least in part, on the quantity of consecutive base games in which a losing outcome is produced.

34. The method of claim 25 wherein said step of identifying a plurality of changeable bonus award amounts for display on said bonus selection apparatus occurs during the course of said base game.

35. The method of claim 34 wherein the display of said bonus award amount changes during the course of said base game.

36. The method of claim 25 wherein said method includes conducting a series of base games and said step of identifying a plurality of changeable bonus award amounts for display on said bonus selection apparatus occurs between base games.

37. The method of claim 36 wherein the display of said bonus award amounts changes between base games.

38. The method of claim 36 wherein the display of said bonus award amounts changes during the course of said base game.

* * * * *